US010728974B2

(12) United States Patent
Moosmann et al.

(10) Patent No.: US 10,728,974 B2
(45) Date of Patent: Jul. 28, 2020

(54) LIGHTING SYSTEM FOR CHANGING THE EMISSION CHARACTERISTICS OPERATING IN AT LEAST A FIRST MODE AND A SECOND MODE AND COMPRISING LEDS, A CONVERTER, AND AN OPERATING UNIT

(71) Applicant: TRIDONIC GMBH & CO KG, Dornbirn (AT)

(72) Inventors: Florian Moosmann, Muntlix (AT); Frank Lochmann, Esseratsweiler (DE); Rainer Troppacher, Dornbirn (AT); Patrick Marte, Gotzis (AT); Johannes Bachmann, Gotzis (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 464 days.

(21) Appl. No.: 15/522,341

(22) PCT Filed: Nov. 30, 2015

(86) PCT No.: PCT/AT2015/050305
§ 371 (c)(1),
(2) Date: Apr. 27, 2017

(87) PCT Pub. No.: WO2016/086252
PCT Pub. Date: Jun. 9, 2016

(65) Prior Publication Data
US 2017/0325309 A1    Nov. 9, 2017

(30) Foreign Application Priority Data

Dec. 5, 2014   (AT) .................................. 427/2014 U

(51) Int. Cl.
*H05B 45/20*   (2020.01)
*H05B 45/10*   (2020.01)
(Continued)

(52) U.S. Cl.
CPC ............ *H05B 45/20* (2020.01); *H02J 7/0068* (2013.01); *H02J 7/35* (2013.01); *H05B 45/00* (2020.01);
(Continued)

(58) Field of Classification Search
CPC ........ H05B 45/00; H05B 45/10; H05B 45/20; H05B 47/19; H02J 7/37; H02J 7/0068; Y02B 20/48
See application file for complete search history.

(56) References Cited

U.S. PATENT DOCUMENTS 6,744,223 B2 *   6/2004   Laflamme .......... H05B 33/0863
                                                          315/291
8,698,607 B2 *   4/2014   Van De Sluis .... H05B 37/0272
                                                          340/12.22
(Continued)

FOREIGN PATENT DOCUMENTS

EP         1512902       3/2005
JP       2005242441      9/2005
(Continued)

OTHER PUBLICATIONS

Austria search report dated Oct. 22, 2015 in priority Austria Application GM 427/2014.
(Continued)

*Primary Examiner* — Tung X Le
*Assistant Examiner* — Borna Alaeddini
(74) *Attorney, Agent, or Firm* — Andrus Intellectual Property Law

(57) ABSTRACT

The invention relates to a lighting system for at least one light-emitting means (24), in particular for light-emitting diodes, comprising a light fixture (22, 43, 61), in which the light-emitting means (24) and mechanical components like a housing, cooling element, reflector, etc. are located; com-
(Continued)

prising a convertor (23) for operating the light-emitting means (24); comprising an operating unit (10) having a charge storage (11), like a smart phone, for example, for changing a mode of operation of the lighting system (20), wherein in a first mode of operation, light is emitted across a first light exit surface by the lighting system (20), and in a second mode of operation, light is emitted across a second light exit surface, wherein the first light exit surface and the second light exit surface have different light emission characteristics.

15 Claims, 3 Drawing Sheets

(51) Int. Cl.
  *H05B 45/00*  (2020.01)
  *H05B 47/19*  (2020.01)
  *H02J 7/00*  (2006.01)
  *H02J 7/35*  (2006.01)

(52) U.S. Cl.
  CPC ............ *H05B 45/10* (2020.01); *H05B 47/19* (2020.01); *Y02B 20/48* (2013.01)

(56) References Cited

U.S. PATENT DOCUMENTS

| | | | |
|---|---|---|---|
| 8,730,035 B2* | 5/2014 | Nagashima | H05B 37/0227 340/539.23 |
| 9,474,130 B2* | 10/2016 | Van De Sluis | H05B 33/0863 |
| 10,312,697 B1* | 6/2019 | Stieber | H02J 7/007 |
| 2005/0117332 A1 | 6/2005 | Maack | |
| 2007/0114967 A1* | 5/2007 | Peng | H02J 7/025 320/101 |
| 2009/0289503 A1 | 11/2009 | Hayashi et al. | |
| 2010/0264830 A1 | 10/2010 | Van Endert et al. | |
| 2012/0300451 A1 | 11/2012 | Jin et al. | |
| 2013/0214696 A1 | 8/2013 | Huang et al. | |
| 2013/0234607 A1 | 9/2013 | Electronics And Telecommunications Research Instit | |
| 2014/0103837 A1 | 4/2014 | Rohm Co Ltd | |
| 2014/0119022 A1 | 5/2014 | Beausoleil | |
| 2016/0109959 A1* | 4/2016 | Heo | G06F 3/017 340/5.52 |

FOREIGN PATENT DOCUMENTS

| | | |
|---|---|---|
| WO | 2004021301 | 3/2004 |
| WO | 2007063480 | 6/2007 |
| WO | 2011156620 | 12/2011 |
| WO | 2014047621 | 3/2014 |
| WO | 2014060874 | 4/2014 |

OTHER PUBLICATIONS

International Search Report in parent PCT Application PCT/AT2015/050305.

* cited by examiner

LIGHTING SYSTEM FOR CHANGING THE EMISSION CHARACTERISTICS OPERATING IN AT LEAST A FIRST MODE AND A SECOND MODE AND COMPRISING LEDS, A CONVERTER, AND AN OPERATING UNIT

CROSS REFERENCE TO RELATED APPLICATION

The present application is the U.S. national stage application of International Application PCT/AT2015/050305, filed Nov. 30, 2015, which international application was published on Jun. 9, 2016 as International Publication WO 2016/086252 A1. The International Application claims priority to Austria Patent Application GM 427/2014, filed Dec. 5, 2014.

FIELD OF THE INVENTION

The invention relates to a lighting system that changes mode of operation to change light emission characteristics, and a procedure to operate such a lighting system.

BACKGROUND OF THE INVENTION

Semiconductor light sources such as light-emitting diodes have become increasingly interesting for lighting applications over the last few years. The reason for this is, among other things, that significant technical innovations and great progress has been achieved both with the brightness and the light efficiency (light output per watt) of these light sources. Not least thanks to the comparatively long service life, light-emitting diodes were able to develop into an attractive alternative to conventional light sources such as incandescent lamps or gas discharge lamps.

Semiconductor light sources are well known from the state of the art and are referred to as light-emitting diodes hereinafter. In the following, this term shall comprise both light-emitting diodes from inorganic materials and light-emitting diodes from organic materials. It is known that the light emission of light-emitting diodes correlates with the current flow through the light-emitting diodes. For brightness control, light-emitting diodes can be controlled through an operating unit. In a portable operating unit with a battery, such as a smart phone, the life of the battery is very limited and constitutes a significant problem. Charging the battery is principally accomplished over a wired connection with a charging unit. Besides the charging unit, charging also requires a suitable power supply, such as a power socket, to achieve a successfully charge the battery.

The present invention provides a circuit and a method that takes this situation into account, and that enables a specific modification of the light emission characteristics, for example based on charge of a battery for a wireless operating unit.

SUMMARY OF THE INVENTION

It is the task of the present invention to provide a lighting system that is improved compared with the state of the art, and a method to operate a lighting system that causes a specific change of the light emission characteristic of the light in a simple manner. According to a first aspect of the invention, a lighting system for at least one light-emitting means, particularly for light-emitting diodes, including a light fixture, in which the light-emitting means and mechanical components like a housing, cooling element, reflector, etc. are located. The system also includes a converter for operating the light-emitting means, and an operating unit having a battery, like a smart phone, for example. The operating unit changes the mode of operation of the lighting system. In a first mode of operation, light is emitted across a first light exit surface by the lighting system. In a second mode of operation, light is emitted across a second light exit surface, wherein the first light exit surface and the second light exit surface have different light emission characteristics.

When changing the mode of operation from the first mode of operation to the second mode of operation, a part of a first group of light-emitting diodes can be deactivated and/or a second group of light-emitting diodes can be activated.

The first group of light-emitting diodes can have a light emission characteristic for the extensive light emission, and the second group of light-emitting diodes can have a light emission characteristic of focused light. The second group of light-emitting diodes can emit invisible light, particularly light in the infrared range.

The focusing of the light can be performed with a controllable emitter and/or reflector and/or a controllable lens.

The operating unit can be configured to transmit commands to the converter via a wired and/or wireless connection.

The direction of the focusing of the light can be dependent on a locating signal.

The converter may possess means for locating, to focus the light dependent on a locating signal.

The means for locating can thereby determine the position of the operating unit.

The operating unit can have means to charge the battery through light, particularly one or several photovoltaic cells. The focusing of the light can facilitate of the battery of the operating unit, by focusing light on the photovoltaic cells.

The operating unit can automatically send a command for the deactivation of the second mode of operation with a full charge state and can automatically send a command for the activation of the second mode of operation with a low charge state.

In case of a large number of light fixtures, the operating unit can select the light fixture for the change of the mode of operation, which is closest to the operating unit.

Besides changing the mode of operation, the operating unit can also transmit further commands to the lighting system.

A method is furthermore disclosed to operate a lighting system for at least one light-emitting means, in particular for light-emitting diodes, whereby an operating unit with a battery such as a smart phone can change the mode of operation of the lighting system, whereby in a first mode of operation, the lighting system can emit light across a first light exit surface and in a second mode of operation, can emit light across a second light exit surface, wherein the first light exit surface and the second light exit surface can have different light emission characteristics.

The method can additionally deactivate a part of a first group of light-emitting diodes and/or activate a second group of light-emitting diodes when changing the mode of operation.

BRIEF DESCRIPTION OF THE DRAWINGS

The invention is now also described by means of figures. The following is thereby shown in.

DETAILED DESCRIPTION

Figure 1:
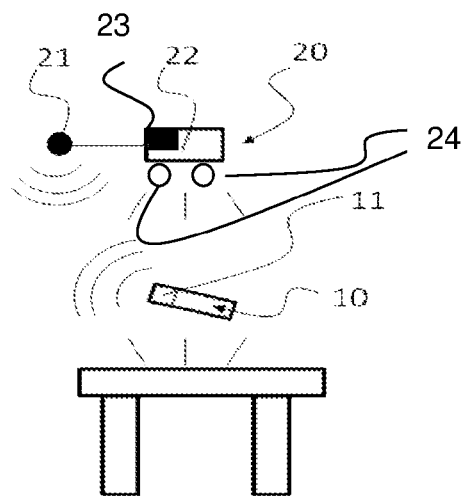
FIG. 1 is a schematic view of a lighting system.

FIG. 1 shows, by way of example, a first aspect of the invention. A lighting system 20 includes at least one light-emitting means 24, such as gas discharge lamps, high-pressure lamps, laser diodes, or light-emitting diodes. The lighting system 20 also includes a light fixture 22, in which the light-emitting means 24 and mechanical components like a housing, cooling element, reflector, etc. can be located. It also includes a converter 23 for operating the light emitting means 24, an operating unit 10 having a battery 11, like a smart phone, for example. The operating unit is adapted to change a mode of operation of the lighting system 20 In a first mode of operation, light is emitted across a first light exit surface by the lighting system 20. In a second mode of operation, light is emitted across a second light exit surface. The first light exit surface and the second light exit surface can have different light emission characteristics.

Figure 3:
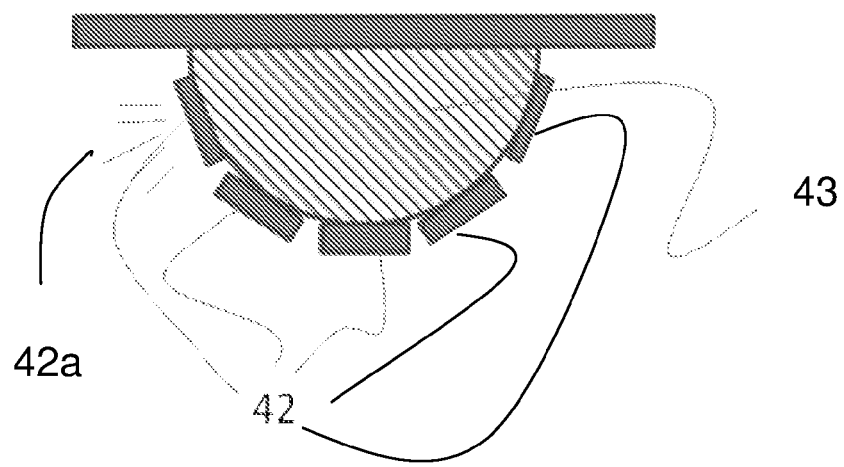
FIG. 3 is a schematic view of a light fixture with an adjustable light emission characteristic.

FIG. 3 shows a light fixture 43 that can deactivate a part of a first group of light-emitting diodes 42 and/or can activate a second group of light-emitting diodes 42a when changing from the first mode of operation to the second mode of operation. All light-emitting diodes 42 can thereby be activated in the first mode of operation and at least one light-emitting diode 42a can be activated in the second mode of operation and the remaining light-emitting diodes can be deactivated. The light-emitting diode 42a can be activated or also deactivated in the first mode of operation and can thus only be activated in the second mode of operation. Besides the light-emitting diode 42a, further light-emitting diodes can also be activated in the second mode of operation. The number of activated light-emitting diodes 42 of the second group can be dependent subject to a locating signal.

The first group of light-emitting diodes 42 can have a light emission characteristic for the extensive emission, which is used for lighting a room, for example, so that the room is illuminated bright enough. The second group of light-emitting diodes can have a light emission characteristic of focused light, which emits light specifically in one direction. The brightness of the second group of light-emitting diodes 42a is preferably lower than the brightness of the first group of light-emitting diodes 42. The brightness can also remain unchanged when changing the mode of operation. The second group of light-emitting diodes 42a can also belong to the first group of light-emitting diodes 42.

The second group of light-emitting diodes 42a can emit visible or invisible light focused, particularly light in the infrared range.

Alternatively, the second group of light-emitting diodes 42a can consist of laser diodes in whole or in part. The laser diodes can direct light specifically in one direction by means of a reflector. The activation of the laser diodes can be done with an operating unit 10 either wireless or wired. A confirmation prompt of the operating unit can thus take place to prevent an unintentional activation of the laser diodes.

Figure 4:
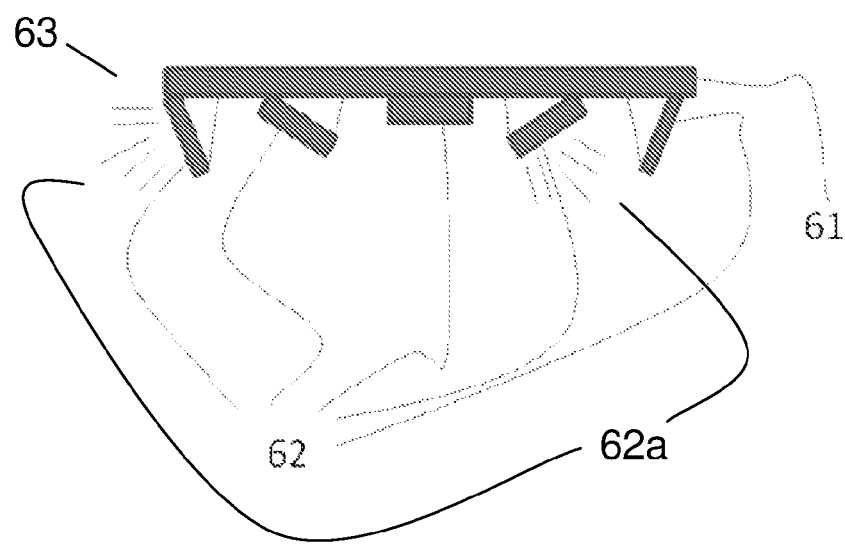
FIG. 4 is a schematic view of another light fixture with an adjustable light emission characteristic, FIG. 5, a schematic view of a square formation of light-emitting diodes.

FIG. 4 shows a further embodiment of a light fixture 61, in which in a first mode of operation, a first group of light-emitting diodes 62 can be activated, and in a second mode of operation, a second group of light-emitting diodes 62 can be activated. Several activated light-emitting diodes 62a are shown in this embodiment as opposed to the embodiment of the light fixture 43 shown in FIG. 3.

The focusing of the light can be done with controllable emitters 63. Either the outermost emitters or also only one emitter can thus be controlled, but it is also possible that all emitters can be controlled to focus the light. A controllable reflector and/or a controllable lens can additionally be used to focus the light. The controllable reflector and the controllable lens are not shown in the figures for reasons of clarity.

The direction of the focusing of the light can be dependent on a locating signal. The controllable emitters 63 or the controllable reflector and/or controllable lens can be aligned depending on the locating signal.

Different directions or different focuses of the light may also be set, when there are more than one operating unit in a room, for example.

Figure 2:
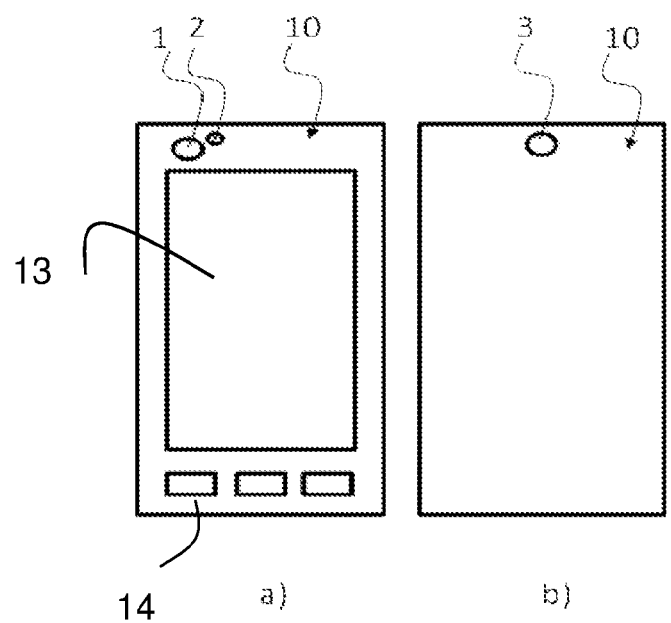
FIG. 2 is a schematic view of an operating unit.

FIG. 2 shows a schematic view of an operating unit 10 designed to transmit commands to the converter 23 either wired or wireless. The operating unit can have a wireless interface not shown in the figures or another wired interface to transmit the commands. The operating unit 10 can be portable or can be firmly attached to a wall. The operating unit 10 can have means to charge the battery 11 through light, such as one or several photovoltaic cells 13 in particular. The photovoltaic cells 13 can be attached both on the front and the rear of the operating unit 10. Alternately, the photovoltaic cells 13 can be connected to the operating unit 10 externally, such as through a USB connection.

The charging of the battery 11 through the photovoltaic cells 13 can be done with visible or invisible light.

Besides changing the mode of operation, the operating unit 10 can also transmit further commands to the lighting system 20. The further commands may bring about the change of the light color or the brightness.

The converter 23 can operate the light-emitting means and can additionally comprise means for focusing the light dependent on the locating signal. The means for locating 21 can thereby determine the position of the operating unit 10. The locating can be done by means of GPS, Bluetooth, or another radio technology, for example. The means for locating 21 can be arranged in the light fixture, in the converter 23, or also externally, that is, outside of the light fixture.

The focusing of the light can bring about a charging of the battery 11 of the operating unit. The focusing of the light thereby simulates a solar radiation on the photovoltaic cell 13 of the operating unit 10.

In case of a full charge, the operating unit 10 can automatically send a command to the means for locating 21 to deactivate the second mode of operation wireless and/or wired, and in case of a low charge state, can automatically send a command for activation of the second mode of operation.

In case of a large number of light fixtures, the operating unit 10 can select the light fixture for the change of the mode of operation, which is closest to the operating unit 10. The identification, which light fixture is located closest, may take place through a query command from the operating unit 10, which first evaluates a feedback signal that can come from the means for locating 21, for example. In a next step, the operating unit 10 transmits an activation signal to the means for locating 21 of the light fixture closest to the operating unit 10 based on the evaluation of the feedback signal. The second mode of operation can be activated until the operating unit 10 transmits a deactivation command to the means for locating 21. This can take place automatically with a full charge of the battery 11 or by activating a button 14 that is located on the operating unit 10.

Figure 5:
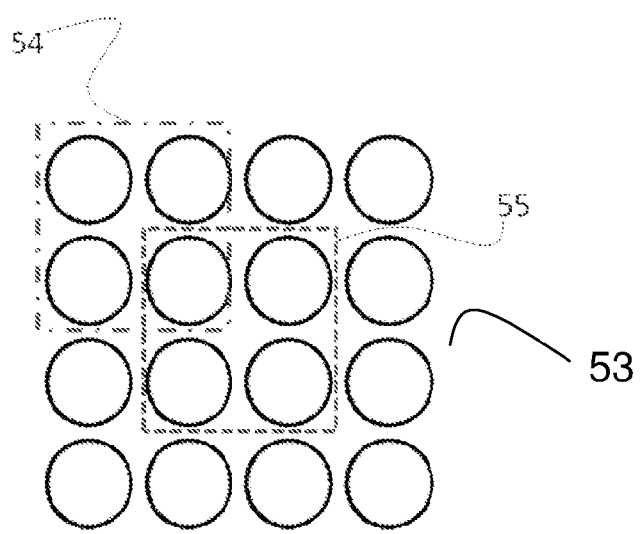

FIG. 5 shows a square formation of light-emitting diodes 53 which can be used in a square light fixture. The classification of the first group of light-emitting diodes 55 can be done through a command of the operating unit 10, and the classification of the second group of light-emitting diodes 54 can be done depending on the locating signal. Light-emitting diodes can belong to both the first and the second group. More adjustable groups of light-emitting diodes are also possible.

Analogously to the previously described lighting system, a method is furthermore disclosed for operating a lighting system for at least one light-emitting means 24, such as gas discharge lamps, high-pressure lamps, or light-emitting diodes, whereby an operating unit 10 having a battery 11, like a smart phone, for example, can change the mode of operation of the lighting system 20, wherein in a first mode of operation, light is emitted across a first light exit surface by the lighting system (20), and in a second mode of operation, light is emitted across a second light exit surface, wherein the first light exit surface and the second light exit surface can have different light emission characteristics.

Besides the charging of a battery 11, the focusing of the light can also be used for the accentuation of objects, such as exhibition pieces. The exhibition pieces can send an activation command to the means for locating 21 of the light fixture, preferably wireless through a radio interface. Alternately, a work surface can also be lit specifically with focused light.

What is claimed is:

1. A lighting system for at least one light-emitting means (24) comprising light-emitting diodes, comprising:
    a light fixture (22, 43, 61), in which the light emitting means (24) are located;
    a converter (23) for operating the light-emitting means (24); and
    an operating unit (1), having a battery (11) for changing a mode of operation of the lighting system (20);
    wherein the lighting system can operate in at least a first mode of operation and a second mode of operation, and in the first mode of operation, light is emitted across a first light exit surface by the lighting system (20), and in the second mode of operation, light is emitted across the second light exit surface, and further wherein the first light exit surface and the second light exit surface have different light emission characteristics; and
    wherein the at least one light-emitting means comprises light emitting diodes and when changing the mode of operation from the first mode of operation to the second mode of operation, a part of a first group of light-emitting diodes (42, 62, 55) is deactivated and/or a second group of light diodes (42a, 62a, 54) is activated, and the first group of light-emitting diodes (42, 62, 55) has a light emission characteristic for extensive emission for lighting a room and the second group of light-emitting diodes (42a, 62a, 54) has a light emission characteristic of focused light that is controlled to emit in one specific direction, and, the specific direction of the focused light is controlled by the operating unit through the control of at least one of a controllable light-emitting diode, a controllable reflector and a controllable lens.

2. The lighting system according to claim 1, wherein the second group of light-emitting diodes (42a, 62a, 54) emits invisible light in the infrared range.

3. The lighting system according to claim 1 wherein the operating unit (10) is configured to transmit commands to the converter (23) via wired or wireless transmission.

4. The lighting system according to claim 3, wherein the direction of the focusing of the light is dependent on a locating signal.

5. The lighting system according to claim 4, wherein the converter (23) has means for locating (21) to focus the light on the locating signal.

6. The lighting system according to claim 5, wherein said means for locating (21) determines the position of the operating unit.

7. The lighting system according to claim 6, characterized in that the focusing of the light brings about a charge of the battery (11) of the operating unit (10).

8. The lighting system according to claim 7, wherein the operating unit has means to charge the battery (11) through light in the form of one or several photovoltaic cells (13).

9. The lighting system according to claim 8, wherein the operating unit (1), with a full charge of the battery (11), automatically sends out a command to deactivate the second mode of operation.

10. The lighting system according to claim 9, wherein the operating unit (10), in case of a low charge state, automatically sends out a command to activate the second mode of operation.

11. The lighting system according to claim 10, wherein the operating unit (10), in case of a large number of light fixtures, selects the light fixture (22, 43, 61) closest to the operating unit (10) to change the mode of operation.

12. The lighting system according to claim 11, wherein besides changing the mode of operation, the operating unit (10) sends additional commands to the lighting system.

13. The lighting system according to claim 1 wherein the operating unit is a smart phone.

14. A method for operating a lighting system for light-emitting diodes, the method comprising the steps of:
    providing an operating unit (10) that is a smart phone having a battery (11);
    using the smart phone to select the mode of operation of the lighting system (20);
    if a first mode of operation is selected, emitting by the lighting system (20), light across a first light exit surface;
    and if the second mode of operation is selected, emitting light by the lighting system (20) across a second light exit surface, wherein the first light exit surface and the second light exit surface have different light emission characteristics; and
    wherein when changing the mode of operation from the first mode of operation to the second mode of operation, a part of a first group of light-emitting diodes (42, 62, 55) is deactivated and/or a second group of light-emitting diodes (42a, 62a, 54) is activated, and the first group of light-emitting diodes (42, 62, 55) has a light emission characteristic for the extensive light emission for lighting a room and the second group of light-emitting diodes (42a, 62a, 54) has a light emission characteristic of focused light that specifically emits in one direction, and, the direction of the focused light is controlled by controlling at least one of a controllable light-emitting diode, a controllable reflector and a controllable lens.

15. The method according to claim 14, wherein the operating unit (10) transmits commands to the converter (23) wirelessly.

* * * * *